US008363569B2

(12) United States Patent
Byard

(10) Patent No.: US 8,363,569 B2
(45) Date of Patent: Jan. 29, 2013

(54) SYSTEM AND METHOD FOR REJOINING SLEEPING SUBNETS IN A WIRELESS MESH NETWORK

(75) Inventor: Robert P. Byard, Sandy, UT (US)

(73) Assignee: Digi International Inc., Minnetonka, MN (US)

(*) Notice: Subject to any disclaimer, the term of this patent is extended or adjusted under 35 U.S.C. 154(b) by 329 days.

(21) Appl. No.: 12/428,053

(22) Filed: Apr. 22, 2009

(65) Prior Publication Data

US 2010/0271974 A1  Oct. 28, 2010

(51) Int. Cl.
*H04L 12/28* (2006.01)

(52) U.S. Cl. ........ 370/254; 370/311; 370/328; 370/503; 455/343.2; 713/323

(58) Field of Classification Search .................. None
See application file for complete search history.

(56) References Cited

U.S. PATENT DOCUMENTS

| 7,710,944 B1* | 5/2010 | Yoon | 370/350 |
|---|---|---|---|
| 2007/0171910 A1* | 7/2007 | Kumar | 370/392 |
| 2010/0135267 A1* | 6/2010 | Strutt et al. | 370/338 |
| 2010/0226342 A1* | 9/2010 | Colling et al. | 370/336 |

FOREIGN PATENT DOCUMENTS

| WO | WO-2005/064824 A1 | 7/2005 |
| WO | WO-2005/088913 A1 | 9/2005 |
| WO | WO-2007/040610 A1 | 4/2007 |

OTHER PUBLICATIONS

Aguayo, Daniel, et al., "Link-level Measurements from an 802.11b Mesh Network", SIGCOMM '04, Aug. 30-Sep. 3, 2004, Portland, Oregon, (2004), 11 pgs.
Kim, Kyu-Han, et al., "On Accurate Measurement of Link Quality in Multi-hop Wireless Mesh Networks", MobiCom '06, Sep. 23-26, 2006, Los Angeles, California, (2006), 38-49 pgs.
"European Application Serial No. 10160794.3, European Search Report mailed Nov. 30, 2011", 6 pgs.
Jalil, K. A., et al., "Handling the Convergence of Mobile Sub-Networks in a Personal Distributed Environment", *IEEE 3rd International Symposium on Wireless Comm Systems*, (ISWCS '06), (2006), 123-127.

* cited by examiner

*Primary Examiner* — Ayaz Sheikh
*Assistant Examiner* — Nicholas Sloms
(74) *Attorney, Agent, or Firm* — Schwegman Lundberg & Woessner, P.A.

(57) ABSTRACT

A system and method for joining nodes from a first and a second subnet into a network. A probability is established that a node within the first subnet will enter scout mode during its sleep interval, wherein the probability is less than 100%. If the node enters scout mode, a message is broadcasted from the node in scout mode to other nodes inviting nodes in other subnets to join with the first subnet, wherein the message includes the node's network identifier. If the message broadcasted by the node in scout mode is detected by a node in a second subnet, the node in the second subnet determines whether nodes in the second subnet have the same network identifier as the network identifier in the message broadcast by the node in scout mode. If the nodes in the second subnet have the same network identifier as the network identifier in the message broadcast by the node in scout mode, the nodes in the first and second subnets are combined into a combined network.

15 Claims, 2 Drawing Sheets

SYSTEM AND METHOD FOR REJOINING SLEEPING SUBNETS IN A WIRELESS MESH NETWORK

TECHNICAL FIELD

Disclosed embodiments relate to mesh networks and to sleeping and waking nodes in such networks.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

DETAILED DESCRIPTION

Figure 1:
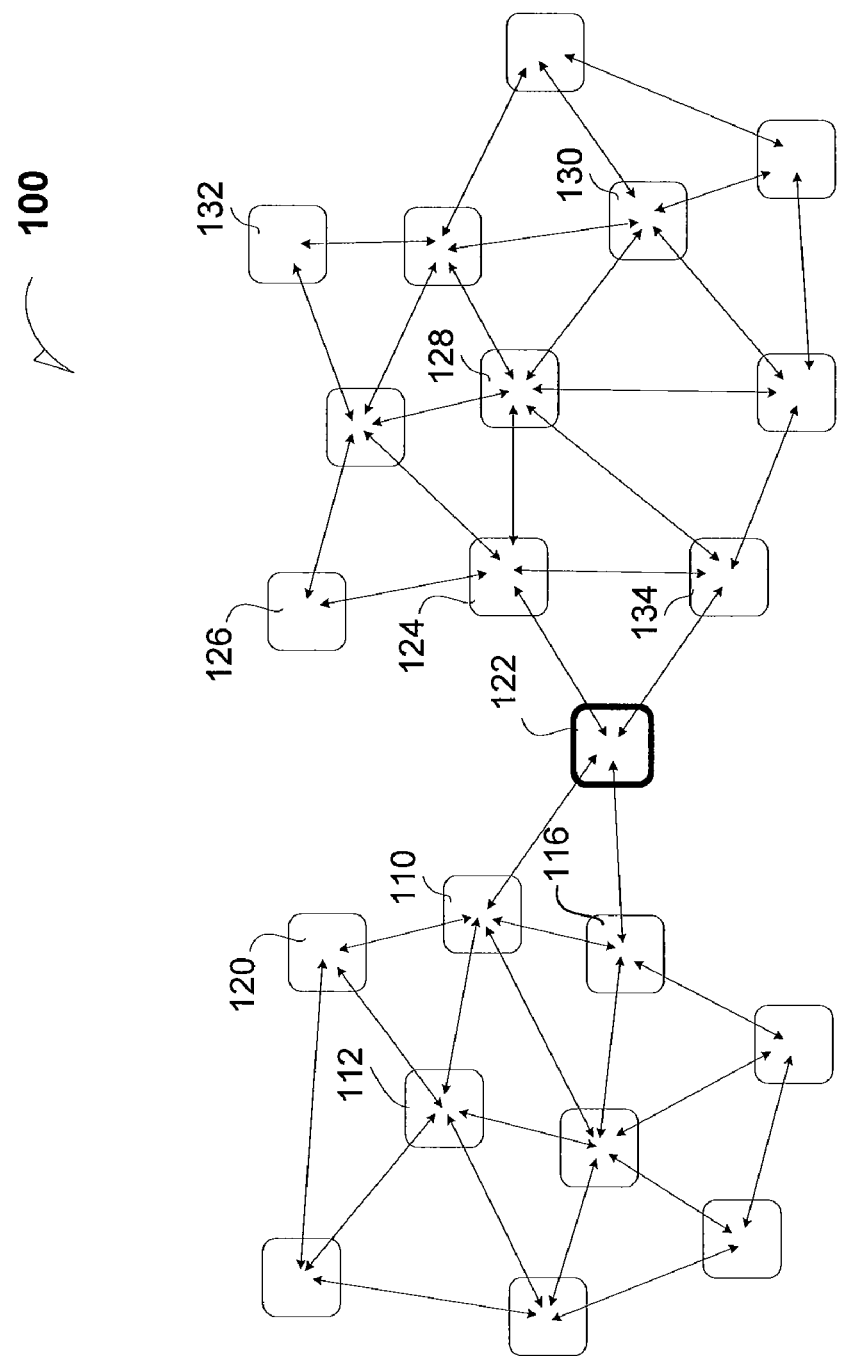
FIG. 1 illustrates a network rejoining two subnets according to an example embodiment.

In the following detailed description of example embodiments, reference is made to specific example embodiments by way of drawings and illustrations. These examples are described in sufficient detail to enable those skilled in the art to practice the disclosed embodiments, and serve to illustrate how the embodiments may be applied to various purposes. Other embodiments exist and logical, mechanical, electrical, and other changes may be made without departing from the subject or scope of the disclosed embodiments. Features or limitations of various embodiments described herein, however essential to the example embodiments in which they are incorporated, do not limit other embodiments and any reference to disclosed embodiment, their elements, operation, and application do not limit the disclosed embodiments as a whole but serve only to define these example embodiments. The following detailed description does not, therefore, limit the scope of the disclosed embodiments, which is defined only by the appended claims.

In some mesh networks, each unique hardware piece has a clock for remaining synchronized with other nodes in the network. The clock in each hardware piece, however, will have slight differences in operating speed. Consequently, each hardware piece will experience clock drift for a node in the network that will eventually cause the network to lose synchronized coherency.

In some mesh networks, clocks are synchronized by an intermittently broadcast clock synchronization message from a broadcast source. Sleeping and waking intervals are established to allow quiet nodes to go into sleep mode when not in use to conserve power. All receiving nodes adjust their sleeping configuration parameters by using synchronization messages from the broadcast source. This behavior is excepted when a receiving node has already received a synchronization message from a more senior node in the mesh network during the current waking interval. Synchronization of sleeping nodes in a mesh network is described in U.S. patent application Ser. No. 12/429358, entitled "SYSTEM AND METHOD FOR SYNCHRONIZING NODES IN A WIRELESS NETWORK," filed herewith, and in U.S. patent application Ser. No. 12/429326, entitled "SYSTEM AND METHOD FOR ADAPTIVELY SETTING THE PROBABILITY OF GENERATING A BEACON BROADCAST IN A WIRELESS NETWORK," filed herewith, the descriptions of which are incorporated herein by references.

Despite attempts at synchronization, a network composed of synchronized sleeping nodes may break into subnetworks, or subnets, each of which operates in a distinct timeslot from the other. The reason may be, for example, unexpectedly excessive clock drift among the nodes, or the temporary failure of a node which is a unique router between two subnets, or intermittent loss of a link between routers due to changes in the physical environment such as a closed door, a truck moving into the line of sight path between two routers, or a shifting of pallets in a warehouse. When this happens, we need to be able to automatically rejoin these subnets back into one network.

A characteristic of such a disjoined network is that the two or more sleeping subnets are operating with the same network identifier, but are in different, non-overlapping wake-sleep timeslots. This characteristic can be used to advantage. In one approach, a node occasionally schedules an extra waking period during its sleep to enter a scout mode and scout for errant subnets. The scouting node invites smaller nets to join its own, or receives a response inviting the scout to shift its own network to join a larger one.

The scenario is two (or more) sleeping networks operating with the same network identifier, but in different, non-overlapping timeslots. The nodes of each network wake for a brief interval to exchange messages, then go back to sleep to conserve energy. The sleep time interval is considerably longer than the waking time interval. The physical broadcast boundaries of these networks are presumed to overlap. We wish to rejoin these subnetworks into one network.

In one embodiment, the problem is solved by giving some nodes in a network a small probability (in proportion to the size of the network) per sleep/wake cycle of waking during the sleep time interval. In one embodiment, all nodes are given some small probability of waking during the sleep time interval, because we cannot predict which node or nodes will occupy space in the overlapping boundary between subnets. This scouting interval, if it occurs, will occur at a random time during the sleep interval. When a node wakes up, the node that awakens broadcasts a polling message to seek members of another network operating in a different timeslot but with the same network identifier. The polling message contains information describing the scout's network's size and next scheduled waking timeslot.

In one embodiment, if a node of a smaller network receives the polling message, it broadcasts to its network a message telling all the other nodes to shift their waking time (and other sleeping mode parameters) to match that of the scouting node.

In one such embodiment, if a node of a larger network receives the polling message, it sends a response message to the sender, telling it to tell the nodes in its network to shift their operations in time to match that of the larger network.

In one embodiment, the probability of a node electing to enter this scouting mode is small enough that it does not interfere with the desired operating lifetime determined by the average current draw per cycle and the capacity of the battery.

The result is that during a sleep cycle a given node may awaken during a normal sleep interval to scan the network for members of other subnets that are awake and that have the same network identifier. Consequently, a method for automatically rejoining these subnets into one network is achieved.

The process is illustrated by the network 100 of FIG. 1. In the network of FIG. 1, the nodes including nodes 112, 110, 116, 120 and 122 have formed a first subnet while the nodes including nodes 124, 126, 128, 130, 132 and 134 have formed a second subnet. Each node in network 100 includes a small probability (in proportion to the size of the network) per sleep/wake cycle of waking during the sleep time interval in order to execute the scouting function (scout mode). In one embodiment, this scouting interval, if it occurs, will occur at a random time during the sleep interval.

In the example given, node 122 enters scout mode during its sleep interval and broadcasts a message to other nodes inviting nodes in other subnets to join with the first subnet. The message includes the node's network identifier. If the broadcast message is detected by a node (e.g., node 124) in the second subnet, the node in the second subnet determines whether nodes in the second subnet have the same network identifier as the network identifier in the message broadcast by node 122. If the nodes in the second subnet have the same network identifier as the network identifier in the message broadcast by the node in scout mode, the nodes in the first and second subnets are rejoined into one network.

In one embodiment, two or more sleeping subnets are operating with the same network identifier, but are in different, non-overlapping wake-sleep timeslots. The nodes of each subnet wake for a brief interval to exchange messages, then go back to sleep to conserve energy. The sleep time interval may be longer than the waking time interval. The physical broadcast boundaries of these subnets overlap by at least one node.

Accordingly, for each sleep-wake cycle, each node in a subnet is assigned a probability of waking during the sleep time interval and of broadcasting a polling message to seek members of another subnet that are awake and operating in a different timeslot but with the same network identifier. In an embodiment, the probability of waking again during the sleep time interval is in direct proportion to the size of the subnet.

According to an embodiment, when a given node awakens during the scheduled sleep interval, and before the sleep interval is completed, this node is referred to as a scout. The scout broadcasts a polling message to seek awake members of another subnet that is operating in a different timeslot but with the same network identifier. The polling message contains information that may be mutually relevant to other subnets that are being sought out. The mutually relevant information may describe the subnet size of the scout and also the next scheduled waking timeslot for the scout.

In one embodiment, when the two subnets are the same size, the scouting node of the subnet has to decide which subnet will join the other. The node of the subnet may make a decision to instruct the polled subnet to join itself to the subnet that contains the scout. This may be called "pollee joins poller." According to an embodiment, the node of the subnet may make a decision to request the polled subnet to allow the scout to join itself to the subnet that contains the polled subnet. This may be called "poller joins pollee."

In an embodiment, the probability of a given node to awaken and become a scout is small in comparison to the power reserve capacity of the given node. Where a portion of a mesh network is operating from battery power, the probability is small enough such that a scouting activity will not interfere with an established operating lifetime determined by the average current draw per cycle and the capacity of the battery.

Figure 2:
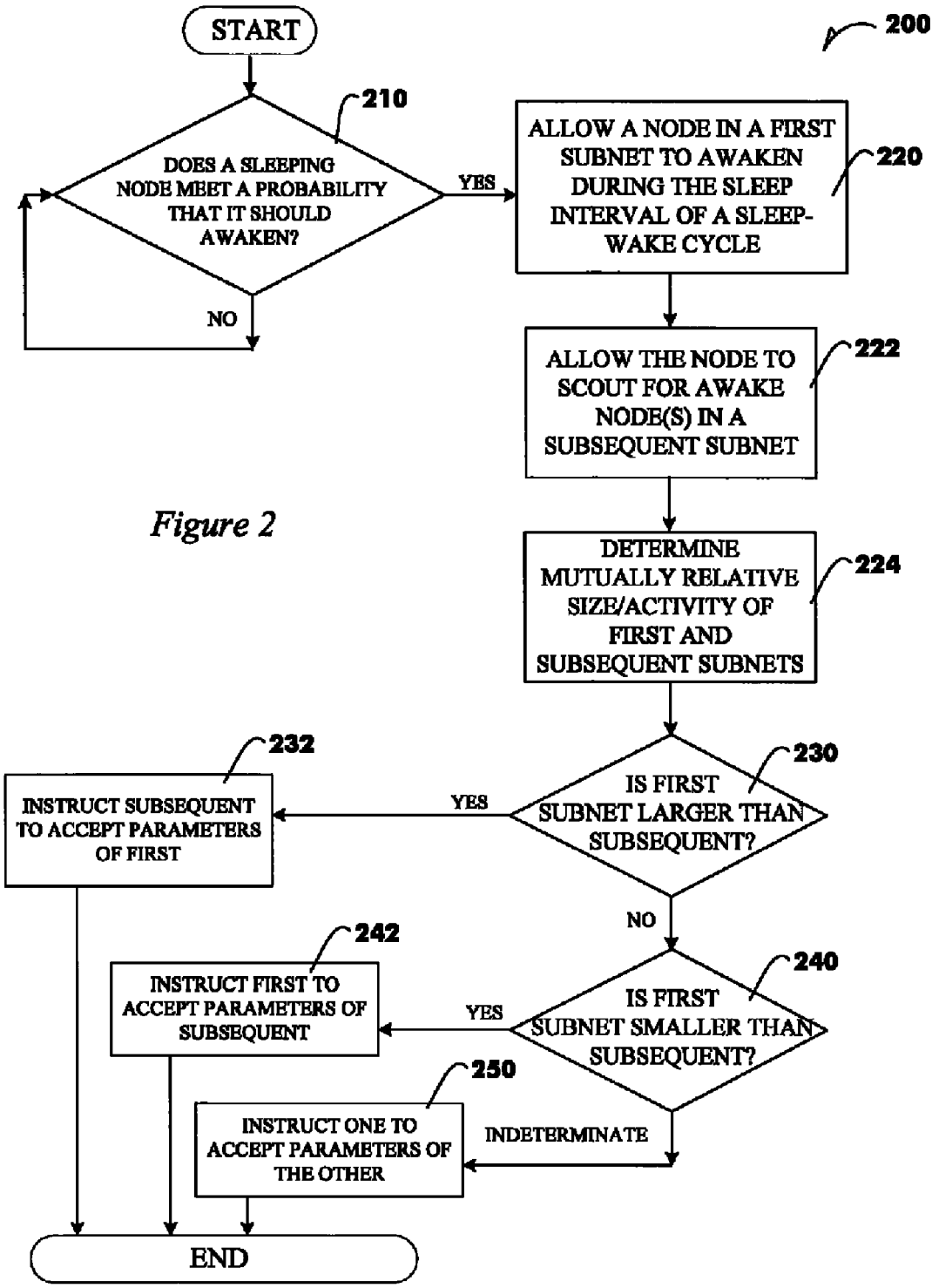
FIG. 2 illustrates a method of waking a node in a sleeping first subnet and polling any subsequent subnets according to an example embodiment.

FIG. 2 illustrates a method 200 of waking a node in a sleeping first subnet and polling any subsequent subnets according to an example embodiment.

At 210, the method includes making a query whether a sleeping node in a first subnet meets a probability that it should awaken during the sleep interval of its sleep-wake cycle. As set forth above, the probability may be determined based in direct proportion to the relative size of the subnet. In an embodiment, the probability may be in direct proportion to the relative activity of the subnet. In an embodiment, the probability may be in direct proportion to a weighted value of the relative activity of the subnet, with respect to a weighted value of the relative size of the subnet. The criteria for the embodiments are intended to spread the burden of scouting across the nodes of a subnet, and thereby mitigate power loss due to scouting. They are also intended to avoid the problem of congestion where two or more nodes elect to scout at the same time and mutually interfere with each other.

At 220, the method includes allowing the node in the first subnet to awaken during the sleep interval of its sleep-wake cycle.

At 222, the method allows the node to scout for awake node(s) in a subsequent subnet.

At 224, the method allows the first subnet and the subsequent subnet to determine mutually relative size and/or activity there between.

At 230, a decision is determined whether the first subnet is larger and/or more active than the subsequent subnet. When the determination is "YES," at 232, the first subnet instructs the subsequent subnet to accept the mutually relative parameters of the first subnet.

At 240, a decision is determined whether the first subnet is smaller and/or less active than the subsequent subnet. When the determination is "YES," at 242, the subsequent subnet instructs the first subnet to accept the mutually relative parameters of the subsequent subnet.

At 250, where no determination was made but conditions are drawn to joining the first and subsequent subnets, an instruction from one subnet is made to accept the mutually relative parameters of the other subnet. The selection of which subnet should accept the other may be made according to criteria other than mutual size, or by prearrangement. For example, as where the subsequent subnet always accepts the parameters of the first subnet.

Although specific embodiments have been illustrated and described herein, it will be appreciated by those of ordinary skill in the art that any arrangement that achieves the same purpose, structure, or function may be substituted for the specific embodiments shown. This application is intended to cover any adaptations or variations of the example embodiments of the invention described herein. It is intended that this invention be limited only by the claims and the full scope of equivalents thereof.

I claim:

1. A method of joining nodes from a first and a second subnet into a network, wherein each subnet includes two or more nodes and wherein each subnet is in a different, non-overlapping wake-sleep timeslot, the method comprising:
   establishing a probability that a node within the first subnet will enter scout mode during which the node will wake between regular synchronized wake periods of the subnet, wherein the probability is less than 100%;
   if the node enters scout mode, broadcasting a message from the node in scout mode to other nodes inviting nodes in other subnets to join with the first subnet, wherein the message includes the node's network identifier; and detecting, within a detecting node in the second subnet, the message broadcast by the node in scout mode; and
determining whether nodes in the second subnet have the same network identifier as the network identifier in the message broadcast by the node in scout mode; and
if the nodes in the second subnet have the same network identifier as the network identifier in the message broadcast by the node in scout mode, combining the nodes in the first and second subnets into a combined network;
wherein each node generates a first and second random number during its sleep interval, wherein, if the first random number is less than a threshold value, the node enters scout mode during that sleep interval, wherein the second random number defines when the node enters scout mode during that sleep interval; and
wherein combining includes:
determining which subnet has fewer nodes;
if the first subnet has fewer nodes than the second subnet, instructing all nodes in the first subnet to synchronize to the second subnet; and
if the first subnet has more nodes than the second subnet, instructing all nodes in the second subnet to synchronize to the first subnet.

2. The method of claim 1, wherein combining includes synchronizing the subnet with fewer nodes to time parameters of the subnet with more nodes.

3. The method of claim 1, wherein each node is designed to enter scout mode at a random time during the sleep interval.

4. The method of claim 1, wherein each node generates a random number during its sleep interval and, if the random number is less than a threshold value, the node enters scout mode during that sleep interval.

5. The method of claim 1, wherein each node generates a first and second random number during its sleep interval, wherein, if the first random number is less than a threshold value, the node enters scout mode during that sleep interval, wherein the second random number defines when the node enters scout mode during that sleep interval.

6. The method of claim 1, wherein combining includes:
if the first subnet has fewer nodes than the second subnet, sending a message from the node in scout mode to the other nodes in the first subnet, wherein the message instructs all nodes in the first subnet to synchronize to the second subnet; and
if the first subnet does not have fewer nodes than the second subnet, sending a message from the detecting node in the second subnet to the other nodes in the second subnet, wherein the message instructs all nodes in the second subnet to synchronize to the first subnet.

7. The method of claim 1, wherein combining includes:
if the first subnet does not have more nodes than the second subnet, sending a message from the node in scout mode to the other nodes in the first subnet, wherein the message instructs all nodes in the first subnet to synchronize to the second subnet; and
if the first subnet has more nodes than the second subnet, sending a message from the detecting node in the second subnet to the other nodes in the second subnet, wherein the message instructs all nodes in the second subnet to synchronize to the first subnet.

8. The method of claim 1, wherein combining includes:
if the first subnet has fewer nodes than the second subnet, sending a message from the node in scout mode to the other nodes in the first subnet, wherein the message instructs all nodes in the first subnet to shift their sleep-wake time interval, as well as other sleeping mode parameters, to match that of the detecting node in the second subnet; and
if the first subnet has more nodes than the second subnet, sending a message from the detecting node in the second subnet to the other nodes in the second subnet, wherein the message instructs all nodes in the second subnet to shift their sleep-wake time interval, as well as other sleeping mode parameters, to match that of the node in scout mode in the first subnet.

9. The method of claim 8, wherein each node generates a first and second random number during its sleep interval, wherein, if the first random number is less than a threshold value, the node enters scout mode during that sleep interval, wherein the second random number defines when the node enters scout mode during that sleep interval.

10. The method of claim 1, wherein combining includes:
if the first subnet has fewer nodes than the second subnet, sending a message from the node in scout mode to the other nodes in the first subnet, wherein the message instructs all nodes in the first subnet to shift their sleep-wake time interval, as well as other sleeping mode parameters, to match that of the detecting node in the second subnet; and
if the first subnet does not have fewer nodes than the second subnet, sending a message from the detecting node in the second subnet to the other nodes in the second subnet, wherein the message instructs all nodes in the second subnet to shift their sleep-wake time interval, as well as other sleeping mode parameters, to match that of the node in scout mode in the first subnet.

11. The method of claim 1, wherein combining includes:
if the first subnet does not have more nodes than the second subnet, sending a message from the node in scout mode to the other nodes in the first subnet, wherein the message instructs all nodes in the first subnet to shift their sleep-wake time interval, as well as other sleeping mode parameters, to match that of the detecting node in the second subnet; and
if the first subnet has more nodes than the second subnet, sending a message from the detecting node in the second subnet to the other nodes in the second subnet, wherein the message instructs all nodes in the second subnet to shift their sleep-wake time interval, as well as other sleeping mode parameters, to match that of the node in scout mode in the first subnet.

12. An article comprising a computer readable medium having instructions thereon, wherein the instructions, when executed by a machine, create a system for executing the method of claim 1.

13. A wireless mesh network, comprising:
a first and a second subnet, wherein each subnet includes two or more nodes and wherein each subnet is in a different, non-overlapping wake-sleep timeslot;
wherein each node communicates wirelessly to one or more other nodes in the network;
wherein each node includes program code for executing a wake/sleep cycle having a wake interval followed by a sleep interval;
wherein each node includes program code for creating a probability that the node will wake during the sleep interval to execute a scout function in which the node will wake between regular synchronized wake periods of a subnet, wherein the probability is less than 100%;
wherein each node includes program code for detecting a node in scout mode and for responding to a message from the node in scout mode if it is in a different subnet and has a common network identifier; and wherein each node includes program code for combining its subnet with a different subnet when they share a common network identifier;

wherein each node includes program code for determining whether nodes in a different subnet have the same network identifier as the network identifier in said message from the node in scout mode; and if a node in the first subnet has the same network identifier as the network identifier in the message broadcast by the node in scout mode, combining the nodes in the respective subnets into a combined network;

wherein each node generates a first and second random number during its sleep interval, wherein, if the first random number is less than a threshold value, the node enters scout mode during that sleep interval, wherein the second random number defines when the node enters scout mode during that sleep interval; and wherein combining includes:

determining which subnet has fewer nodes;

if the first subnet has fewer nodes than the second subnet, instructing all nodes in the first subnet to synchronize to the second subnet; and if the first subnet has more nodes than the second subnet, instructing all nodes in the second subnet to synchronize to the first subnet.

14. The network of claim 13, wherein the program code for creating a probability that the node will wake during the sleep interval is designed to increase the probability that most nodes will sleep the entire sleep interval.

15. The network of claim 13, wherein the program code for creating a probability that the node will wake during the sleep interval includes program code for selecting a random time to awake during the sleep interval.

* * * * *